July 31, 1956

E. B. HAMMOND, JR

2,756,598

GYRO ROLL COMPENSATING SYSTEM

Filed Dec. 1, 1952

2 Sheets-Sheet 1

INVENTOR
*EDMUND B. HAMMOND, JR.*
BY *James P. Malone*
ATTORNEY

United States Patent Office 2,756,598
Patented July 31, 1956

2,756,598

GYRO ROLL COMPENSATING SYSTEM

Edmund B. Hammond, Jr., North Merrick, N. Y., assignor to Sperry Rand Corporation, a corporation of Delaware Application December 1, 1952, Serial No. 323,437

9 Claims. (Cl. 74—5.44)

This invention relates to gyroscopes adapted to measure craft angular displacements from normal attitudes and particularly to means for compensating said gyroscopes. More specifically, the invention provides means for modifying the roll correction of a craft gyroscope proportionally to a function of craft pitch angle.

My copending application 196,315 for Compensated Gyroscopic Horizon, filed November 17, 1950, shows means to minimize roll error by providing a vertical phantom ring which is slaved to the gyroscopic element in pitch and roll by means of suitable servos. The vertical ring is journaled to the roll gimbal and contains a pick-off actuated by an armature mounted on the gyroscope rotor case. The output of the pick-off is fed to the roll servo system to correct the roll gimbal. The useful component of this correction signal is proportional to the cosine of craft pitch angle, and at high pitch angles, i. e., diving or climbing, the roll correction signal decreases sharply as the cosine function of pitch angle. The present invention provides means to modify this roll correction signal according to a function of the pitch angle of the craft so that adequate roll correction signal is obtained regardless of the attitude of the craft.

Accordingly, a principal object of the invention is to provide new and improved gyroscopic compensating means;

Another object of the invention is to provide new and improved gyroscopic compensating means for high craft pitch angles;

Another object of the invention is to provide new and improved means to compensate a craft gyroscope for roll error;

Another object of the invention is to provide new and improved means to compensate a craft gyroscope for roll error at high pitch angles;

Another object of the invention is to provide new and improved means for roll correction as a function of craft pitch angle;

Another object of the invention is to provide new and improved means for roll correction proportional to the secant of craft pitch angle.

Figure 1:
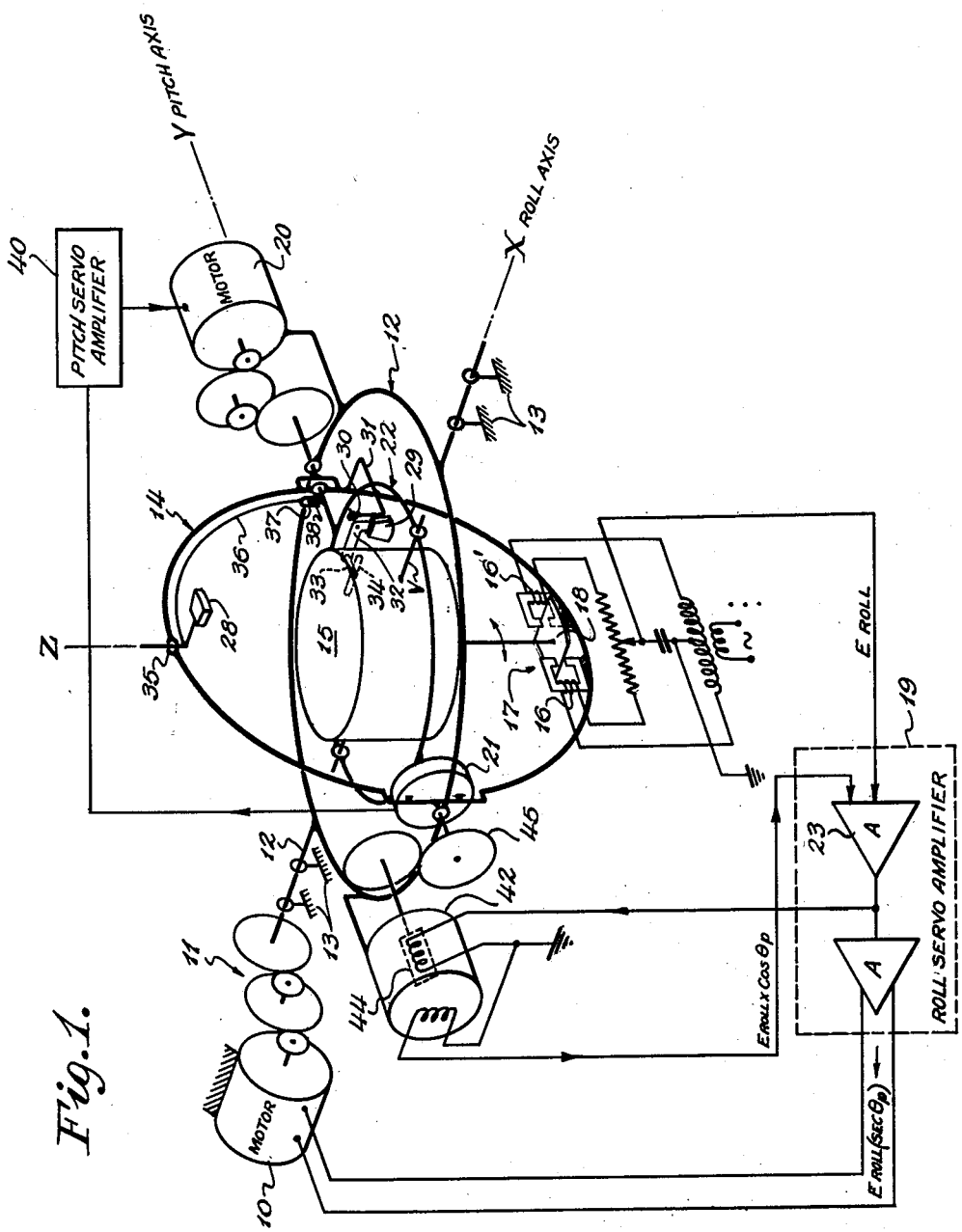
Figure 2:
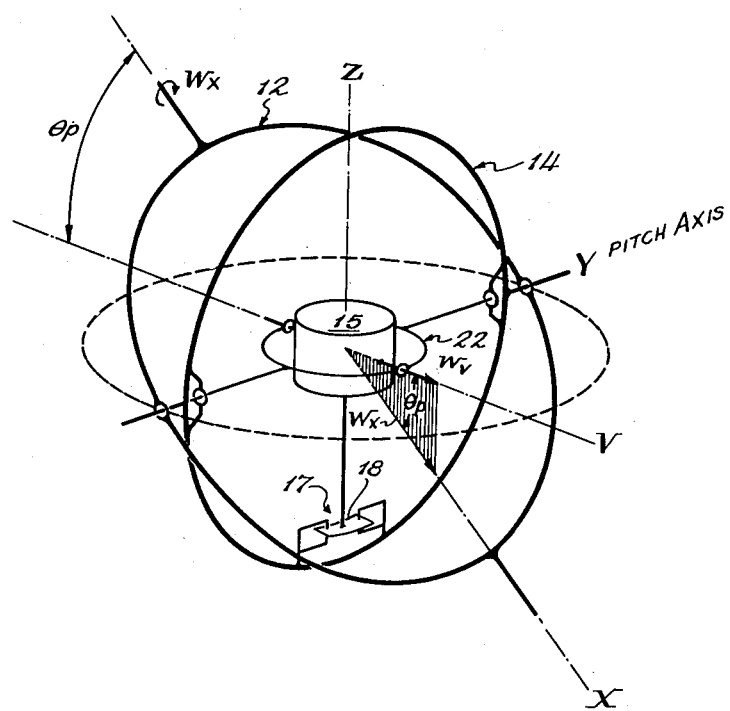

These and other objects of the invention will be apparent from the following specification and figures, of which, Fig. 1 is an embodiment of the invention, and Fig. 2 is a diagram illustrative of the theory of operation of the invention.

The present invention is an improvement of my copending application S. N. 196,315 mentioned above. The roll correction signal is derived by a pick-off attached to a phantom vertical ring as described in that application and applied to a roll servo amplifier. The improvement of the present invention comprises generally taking a portion of said amplifier output, modifying it proportionally to the cosine of craft pitch angle and feeding it back to the input of the servo amplifier. The output of the amplifier will, therefore, provide a signal proportional to the secant of the craft pitch angle. Since the useful component of the pick-off is proportional to the cosine of craft pitch angle, the correction made in the present invention will provide a substantially constant roll compensation signal regardless of the craft pitch angle.

Fig. 1 shows an embodiment of the invention which is quite similar to that shown in my copending application Serial No. 196,315. The roll gimbal 12 is mounted on the craft 13 for rotation about the fore and aft roll axis X. An additional phantom vertical ring 14 is journaled to the roll gimbal 12 for rotation about the pitch axis Y and a pitch gimbal 22 is journalled in the phantom ring 14 also for rotation about the pitch axis Y. The gyro rotor case 15 is, in turn, rotatably mounted on the pitch gimbal 22 for rotation about the craft roll axis X. Thus, there is provided a gyro rotor adapted, in the present embodiment, to spin about a normally vertical axis, a first gimbal means comprising rotor case 15 and gimbal 22 for supporting said rotor for pivotal movement about the roll and pitch axes of the aircraft, and a second gimbal means comprising vertical ring 14 and roll gimbal 12 for supporting the first gimbal means for pivotal movement about the roll and pitch axes of the craft. The phantom ring 14 is vertically stabilized by pick-off 21 coupled between ring 14 and pitch gimbal 22, pitch servo amplifier 40, and pitch servomotor 20. The pick-off 21 measures any displacement between ring 14 and pitch gimbal 22 and actuates the pitch servomotor 20 which moves ring 14 relative to gimbal 22. The phantom vertical ring 14 contains a magnetic pick-off 17 comprising coils 16 and 16', the output of which is controlled by the armature 18 attached to the rotor case 15. The output of the pick-off 17 is connected to the roll servo amplifier 19, the output of which is connected to the roll servomotor 10 which is connected to drive the roll gimbal 12 through the gear train 11. Thus, there is provided pitch and roll servo loops for slaving the second gimbals 12 and 14 to the first gimbals 22 and 15.

Means for applying gravitationally controlled erecting torques on the gyro are provided. These comprise two pendulums, one pendulum 29 being pivoted at 30 on a bracket 31 extending from vertical ring 14. This pendulum is pivoted slightly to one side of the transverse axis Y of the system and has a bell crank arm 32 extending therefrom with a pin 33 engaging a slot 34 in the gyro case parallel with the axis V. With this construction, tilt of the gyro about the gyro axis Y will cause a similar tilt of the vertical ring 14 through the pitch servo system, thereby displacing pivot 30 with respect to pin 33 and tilting pendulum 29 to thereby exert an erecting torque on the gyro about axis V; in other words, at right angles to the tilt. Similarly, an acceleration force on pendulum 29 would also exert a torque about axis V. It should be noted also that the action of the pendulum is primarily dependent on the ring 14 being maintained in a vertical plane. In other words, when the ring 14 becomes inclined about axis Y, the position of the pivot point 30 is shifted with respect to that of pin 33 and the pendulum is tilted, causing pin 33 to exert an erecting torque, through slot 34, on the gyro case.

Similarly, for control of the gyro in roll, there is provided a pendulous eccentric mass 28 which is pivoted on a vertical pivot 35 on the vertical ring 14. This mass has a long curved arm 36 extending from pivot 35 down to a point near the ring 22 where it is forked at 37 and engages a short vertical pin 38 extending upwardly from ring 22. With this construction, it will be seen that no torque is exerted on the gyro as long as the ring 14 and its pivot 35 remain vertical, but that an inclination of the same about the roll axis X will cause the mass to tend to fall toward the low side, thereby exerting a torque on the gyro about axis Y and causing the ring 14 to straighten up through the follow-up system described.

The operation is as follows. Referring to Figs. 1 and 2, when the airplane rolls, the roll servomotor 10 which is attached to the airplane rolls with it. Since the motor gearing 11 is connected to the roll gimbal 12 of the compensated vertical gyro, the shaft of the roll motor will rotate whenever the motor frame or the airplane moves in roll relative to the roll gimbal. If there were no friction present and the inertia of the motor 10 and gear train 11 were neglected, the roll gimbal 12 would remain in a true pitch plane, i. e., the Y-axis would remain horizontal and the shaft rotation of the roll motor would be the roll angle $\theta_r$ of the airplane. However, this idealized system does not exist, and the frame 13 of the airplane, and therefore, the roll gimbal tends to be displaced from the pitch plane whenever the airplane rolls. The phantom ring 14 which moves in roll with the roll gimbal is also displaced and the phantom ring reference axis (Z) is caused to come off true vertical in roll. Meanwhile the gyro 15 is tending to maintain a fixed spin axis due to its inertia. Hence, when the phantom ring moves, the coils 16 and 16' of the roll pick-off 17 which are attached to the phantom ring 14 move in roll relative to the armature 18 of the pick-off which is attached to the vertical gyro rotor case 15.

This relative displacement causes a pick-off error signal $E_o = \theta_r$ to be fed to the roll servo amplifier 19. The output of the roll servo amplifier 19 is used to drive the roll servomotor 10 which moves the roll gimbal 12 and the phantom ring 14 until the error signal is reduced to zero. At this position the phantom ring reference axis is at true vertical and the relative motion between the airplane and the roll gimbal is the roll angle $\theta_r$ of the airplane. Thus, the prime function of the roll servo loop is to overcome the friction that exists between the frame of the compensated vertical gyro and the roll gimbal, or to act as a frictionless bearing.

The pitch servo loop functions in exactly the same manner; the pitch servomotor 20 operates to reduce the pitch error generated at the pitch pick-off 21 to zero so that the final position of the pitch gimbal 22 is the pitch angle $\theta_p$.

However, the roll servo loop has incorporated therein a compensation circuit for varying the action of the roll servo as a function of the pitch angle of the craft. This compensation is accomplished as follows:

Assume that the airplane is at some pitch angle $\theta_p$, Fig. 2, and that it starts to roll about its longitudinal axis X at an angular velocity $W_x$. The roll gimbal 12 of the gyro is at the same pitch angle and assuming friction to be a rigid connection, the roll gimbal tends to rotate about the X-axis with an angular velocity equal to $W_x$ and to pull the phantom 14 along with it.

The phantom ring 14 and the roll pick-off 17 are initially in a vertical plane and the effective relative angular velocity between the coils 16—16' and the armature 18 of the roll pick-off 17 is $W_v = W_x \cos \theta_p$. The roll servomotor 10 causes this error angular velocity to be zeroed out by rotating the roll gimbal. Therefore, the angular velocity $W_x$ that is required about the axis X in order to zero out the error velocity $W_v$ is $W_x = W_v \sec \theta_p$, i. e., solving for $W_x$ in the equation $W_v = W_x \cos \theta_p$, we have $$W_x = \frac{W_v}{\cos \theta_p}$$

or $W_x = W_v \sec \theta_p$. Therefore, the greater the pitch angle, the greater speed of response of the roll servo loop is obtained by adjusting the gain of the roll servo amplifier to vary approximately as the secant of the pitch angle.

This gain adjustment is accomplished by connecting a pitch angle resolver 42 in a feedback path around amplifier stage 23 in the roll servo amplifier 19. The pitch resolver 42 is mounted on roll gimbal 12 and its rotor 44 is geared to phantom ring 14 by gears 45. The pitch resolver 42 is excited by the output of the feedback amplifier 23 and its rotor 44 is so positioned as to reproduce the cosine of pitch angle $\theta_p$ between its rotor and stator. The voltage fed back by the resolver is then proportional to the product of the excitation and the cosine of the pitch angle, i. e., $KE_o \cos \theta_p$. It can be shown that the gain of the roll feedback amplifier loop is given by the relation:

$$\text{Gain} = \frac{K}{1 + K \cos \theta_p}$$

where K represents the gain of amplifier 23. It is obvious that for large values of K the gain approaches a value proportional to the secant of the dive angle which is the desired result.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A craft gyroscope comprising a rotor case, a follow-up element within which said rotor case is universally mounted, and gimbal means for universally mounting said follow-up element in said craft for rotation about the roll and pitch axis of said craft, a magnetic pick-up mounted on said follow-up element, an armature mounted on said rotor case and adapted to actuate said pick-up, roll servomotor means responsive to said pick-up for driving said gimbal means in roll, and means including pitch responsive means connected and adapted to control said roll servomotor proportionally to the pitch angle of said craft.

2. Apparatus as in claim 1 wherein said control means comprises a pitch resolver having its rotor connected to rotate proportionally to pitch angle, and means connecting the roll servomotor means to said pitch resolver to modify said roll error signal proportionally to the secant of pitch angle.

3. A craft gyroscope comprising a rotor case, a follow-up element within which said rotor case is universally mounted, and gimbal means for mounting said follow-up element in said craft for rotation about the roll and pitch axis of said craft, a magnetic pick-up mounted on said follow-up element, an armature mounted on said rotor case and adapted to actuate said pick-up, a roll servo amplifier connected to said pick-up, a roll servomotor connected to the output of said servo amplifier for driving said gimbal means about said roll axis, a pitch resolver mounted on said gimbal means and having a rotor connected to rotate proportionally to pitch angle, and feedback means connecting said servo amplifier and said pitch resolver whereby a portion of said amplifier signal is modified proportionally to pitch angle and fed back to the input of said amplifier.

4. A universally mounted craft gyroscope, a universal follow-up element within which said gyroscope is universally mounted, a pair of gravity responsive means on said element responsive to tilt of said element about the pitch and roll axes of said craft, means connecting said gravity responsive means to said gyroscope for erecting said gyroscope, a magnetic pick-up mounted on said follow-up element, an armature mounted on said gyroscope and adapted to actuate said pick-up, servomotor means connected to and responsive to said pick-up to correct positional error of said gyroscope, and means connected and adapted to control said servomotor proportionally to the pitch angle of said craft.

5. A universally mounted craft gyroscope, a universal follow-up element within which said gyroscope is universally mounted, a pair of gravity responsive means on said element responsive to tilt of said element about the pitch and roll axes of said craft, means connecting said gravity responsive means to said gyroscope for erecting said gyroscope, a magnetic pick-up mounted on said follow-up element, an armature mounted on said gyroscope and adapted to actuate said pick-up, servomotor means connected to and responsive to said pick-up to correct roll positional error of said gyroscope, and means connected and adapted to control said servomotor proportionally to the secant of pitch angle of said craft.

6. A craft gyroscope having a rotor adapted to spin about a normally vertical axis, first gimbal means for supporting said rotor for pivotal movement about the craft roll and pitch axes, second gimbal means supporting said first gimbal means for pivotal movement about the craft roll and pitch axes, pitch and roll servo loops connected between said first and second gimbal means for slaving said second gimbal means to said first gimbal means, and means responsive to operation of said pitch servo loop for modifying the operation of said roll servo loop.

7. A craft gyroscope having a rotor adapted to spin about a normally vertical axis, first gimbal means for supporting said rotor for pivotal movement about the craft roll and pitch axes, second gimbal means supporting said first gimbal means for pivotal movement about the craft roll and pitch axes, pitch and roll servo loops connected between said first and second gimbal means for slaving said second gimbal means to said first gimbal means, signal generating means responsive to the operation of said pitch servo loop for supplying a signal corresponding to a function of the angular movement of said second gimbal means about said pitch axis, and means responsive to said signal for modifying the operation of said roll servo loop.

8. A craft gyroscope having a rotor adapted to spin about a normally vertical axis, first gimbal means for supporting said rotor for pivotal movement about the craft roll and pitch axes, second gimbal means supporting said first gimbal means for pivotal movement about the craft roll and pitch axes, pitch and roll servo loops connected between said first and second gimbal means for slaving said second gimbal means to said first gimbal means including a roll pick-off for supplying a signal proportional to the error in roll between said first and second gimbal means, a roll servomotor for driving said second gimbal means about said roll axis, control means responsive to said roll error signal and having an output connected to control said roll servomotor, and signal generating means responsive to the operation of said pitch servo loop for supplying a signal proportional to a function of the angular movement of said second gimbal means about said pitch axis, and means for supplying the output of said signal generating means to said control means whereby to modify the operation of said roll servomotor in accordance with a function of the angular movement of said second gimbal means about said pitch axis.

9. A craft gyroscope of the character set forth in claim 8 wherein said signal generating means comprises a cosine resolver having an input winding thereof energized from the output of said control means and an output winding thereof connected in feedback fashion with the input of said control means whereby the operation of said roll servomotor is modified in accordance with the secant function of the angular movement of said gimbal means about said pitch axis.

References Cited in the file of this patent

UNITED STATES PATENTS

| | | |
|---|---|---|
| 2,238,645 | Horn | Apr. 15, 1941 |
| 2,450,320 | Wendt | Sept. 28, 1948 |
| 2,504,604 | Tear | Apr. 18, 1950 |
| 2,542,975 | Adkins | Feb. 27, 1951 |
| 2,597,151 | Konet | May 20, 1952 |